United States Patent [19]

Hisano et al.

[11] Patent Number: 4,654,872
[45] Date of Patent: Mar. 31, 1987

[54] SYSTEM FOR RECOGNIZING THREE-DIMENSIONAL OBJECTS

[75] Inventors: Atushi Hisano, Nagaokakyo; Kazuhiko Saka, Joyo; Noriyuki Tsukiyama, Uji, all of Japan

[73] Assignee: Omron Tateisi Electronics Co., Kyoto, Japan

[21] Appl. No.: 634,043

[22] Filed: Jul. 24, 1984

[30] Foreign Application Priority Data

Jul. 25, 1983 [JP] Japan ................. 58-136084
Sep. 3, 1983 [JP] Japan ................. 58-162344

[51] Int. Cl.⁴ .......................................... G06K 9/00
[52] U.S. Cl. .................................. 382/1; 358/88; 356/2; 356/12; 250/558
[58] Field of Search ............ 382/1; 358/88; 356/2, 356/12; 250/558

[56] References Cited

U.S. PATENT DOCUMENTS

| 3,726,591 | 4/1973 | Helava et al. | 250/558 |
| 3,783,294 | 1/1974 | Koper | 250/558 |
| 4,305,095 | 12/1981 | Dallas | 358/88 |
| 4,506,296 | 3/1985 | Marraud et al. | 358/88 |

Primary Examiner—Leo H. Boudreau
Assistant Examiner—Jose L. Couso
Attorney, Agent, or Firm—Stevens, Davis, Miller & Mosher

[57] ABSTRACT

A system for recognizing a three-dimensional object includes a plurality of image pickup apparatus, e.g. TV cameras, by which images of the object are picked up from at least three directions. Feature points are extracted from each of at least three images obtained. Two sets of feature points on epipolarly lines are formed which lines are formed on at least two of the images by a feature point on another image. A set of feature points is selected which satisfy a restricting condition determined by the relationship of the image picking-up direction.

6 Claims, 7 Drawing Figures

SYSTEM FOR RECOGNIZING THREE-DIMENSIONAL OBJECTS

BACKGROUND OF THE INVENTION

The present invention relates to a system for recognizing three dimensional objects, and more particularly a system which is useful, for example, as the eyes of robots and which is adapted for recognizing the position, shape, size, etc. of a three-dimensional object.

Two image pickup means, for example, TV cameras are necessary for three-dimensionally recognizing three-dimensional objects. Using a multiplicity of points on the images on the two TV cameras, if it is possible to identify two points (one on each of the images) corresponding to a specific point on the object, the position coordinates of these corresponding points on the images and the relationship involved in the arrangement of the TV cameras provide dayta as to the position of the specific point on the object in a three-dimensional space.

However, it is extremely difficult to identify one point on one image corresponding to one point on the other image. It is conventional practice to set a small area, termed a "window" on one image and search on the other image for a brightness distribution similar to the brightness distribution of the small area. This method requires a large number of a repetitions of brightness distribution pattern comparing process and therefore a prolonged period of time for processing and involves the likelihood that it is impossible to establish two points of proper correspondence, whereby the method may fail to recognize the object correctly.

SUMMARY OF THE INVENTION

An object of the present invention is to recognize three-dimensional objects by a simplified process with a shortened processing time and with improved precision.

First, the system of this invention for recognizing a three-dimensional object is characterized in that images of the object are picked up from at least three directions. Feature points are extracted from at least three obtained images. The feature point is a point relating to a feature of the object in respect of its shape (and also to its density and color), for example, a corner where a plurality of lines or surfaces intersect.

The image of a certain feature point on the object appears on each of the at least three images. There are at least two conditions (restricting conditions) for associating the mutually corresponding feature points on these images, when the images are picked up at least from three directions.

The recognizing system of the present invention makes use of the restricting condition that the feature point on one of the images corresponding to the feature point on another image is present on an epipolar line formed on said one image by the feature point on said another image.

Furthermore, the present invention uses another restricting condition which is determined by the image pick-up directions. This condition varies with the arrangement of the TV cameras.

By using these two restricting conditions, it is possible to straightforwardly determine the set of mutually corresponding feature points on the at least three images.

Based on the positions of the mutually corresponding feature points on the images, the position of the corresponding feature point on the object is calculated. The shape, size, position or the like of the object can be recognized by summing up the items of data relating to the positions of a multiplicity of feature points on the object.

DESCRIPTION OF THE PREFERRED EMBODIMENTS

Figure 1:
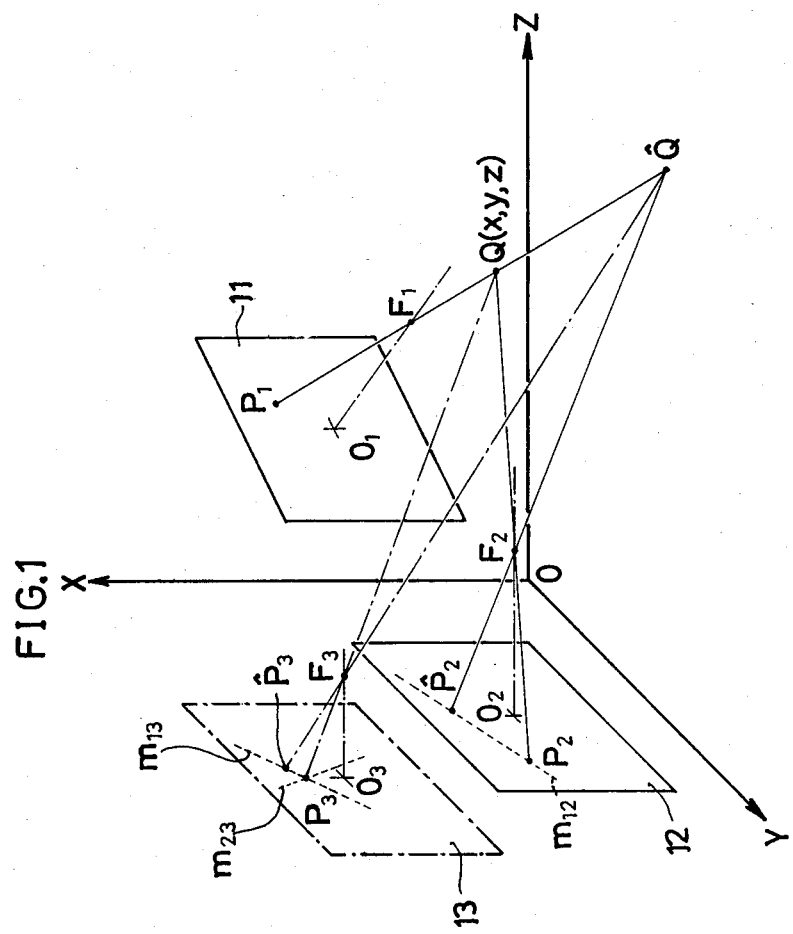
FIG. 1 schematically shows the optical system of a TV camera.

FIG. 1 shows an arrangement wherein images of an object are formed by the optical systems of the two TV cameras. Indicated at Q is a feature point on the object which is three-dimensional. Such a point on three-dimensional objects will be hereinafter referred to as an "object point." The optical systems (lenses) of the TV cameras have centers $F_1$, $F_2$ and image planes (image forming planes) 11, 12, the centers of which are indicated at $O_1$, $O_2$, respectively. The lines $\overline{O_1F_1}$ and $\overline{O_2F_2}$ are the optical axes of the cameras.

An image of the object point Q is formed as a point $P_1$ on the image plane 11 of one of the cameras. Images of points formed on an image plane will be referred to as "image points." The image point of the object point Q appearing on the image plane 12 of the other camera is indicated at $P_2$. Thus, the image points $P_1$ and $P_2$ correspond to the object point Q and also to each other.

If, with respect to one or some image point $P_1$ on the image plane 11, the corresponding point $P_2$ on the image plane 12 can be identified, the position (coordinates (x, y, z)) of the object point Q can be determined. The position of the object point Q is determined as the point of intersection of a line extending from the line $\overline{P_1F_1}$ and a line extending from the line $\overline{P_2F_2}$.

A line through an image point on the image plane of a TV camera and the center of the lens of the TV camera, when projected on the image plane of another TV camera, forms a line image, which is called an epipolar line. With reference to FIG. 1, the line $\overline{P_1F_1Q}$ forms an epipolar line $m_{12}$ on the image plane 12. The image point $P_2$ corresponding to the image point $P_1$ is positioned on the epipolar line $m_{12}$. If the position of the image point $P_1$ on the image plane 11 is known, the epipolar line $m_{12}$ on the image plane 12 can be determined straightforwardly. Suppose, for example, the image plane 12 is present in a plane X-Y. The epipolar line $m_{12}$ is then expressed by the equation $y = bx + c$ where the constants b and c can be determined straightforwardly by the positions (coordinates) of the image point $P_1$ and the central points $F_1$, $F_2$.

Accordingly, the principle that "the point $P_2$ corresponding to the image point $P_1$ is present on an epipolar line formed on the image plane 12 by the image point $P_1$ (the line through the image point $P_1$ and the central point $F_1$)" is a first restricting condition for identifying the corresponding point $P_2$.

Now, an object point $\overline{Q}$ is considered which is present on a line extending from the straight line $\overline{P_1F_1Q}$.

The image point $\overline{P}_2$ on the image plane 12 of the object point $\overline{Q}$ is also present on the epipolar line $m_{12}$. Thus, the point corresponding to the image point $P_1$ can not be identified with use of the first restricting condition only. Accordingly a second restricting condition is necessary.

For the second restricting condition, data obtained by picking up at least another image of the object from a third direction is used. The second condition will be described with reference to the following examples since the condition differs with the image picking-up direction.

Figure 2:
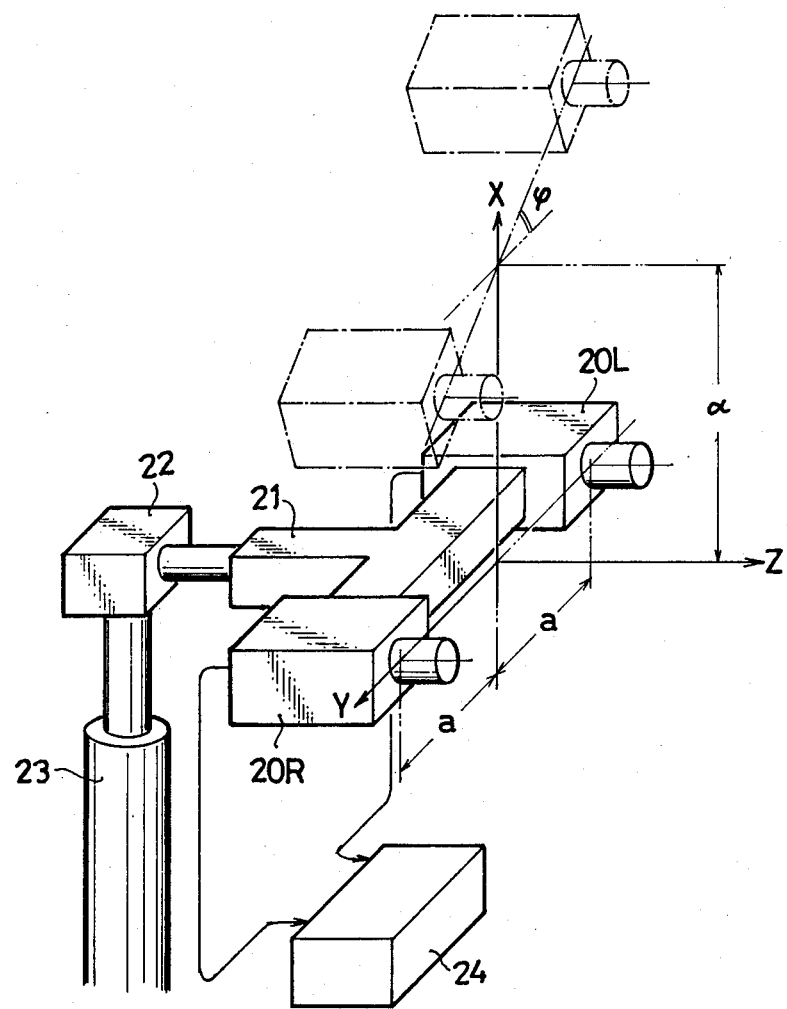
FIG. 2 shows an arrangement of TV cameras according to an embodiment of the present invention.

FIG. 2 shows a special example wherein two TV cameras 20L and 20R are used as arranged side by side. The two cameras 20L and 20R are fixed to an arm 21 and have optical axis in the direction of Z-axis. The centers of the camera lenses are both on a plane X-Y and spaced apart by $2a$ along the Y-direction. The arm 21 is supported by a rotating device 22 and is rotatable about the Z-axis only through $\phi$. The rotating device 22 is movable by a lift device 23 along the X-axis only by $a$. The image signals of the TV cameras 20L and 20R are sent to an image processor 24, which has a CPU and memory.

Figure 3:
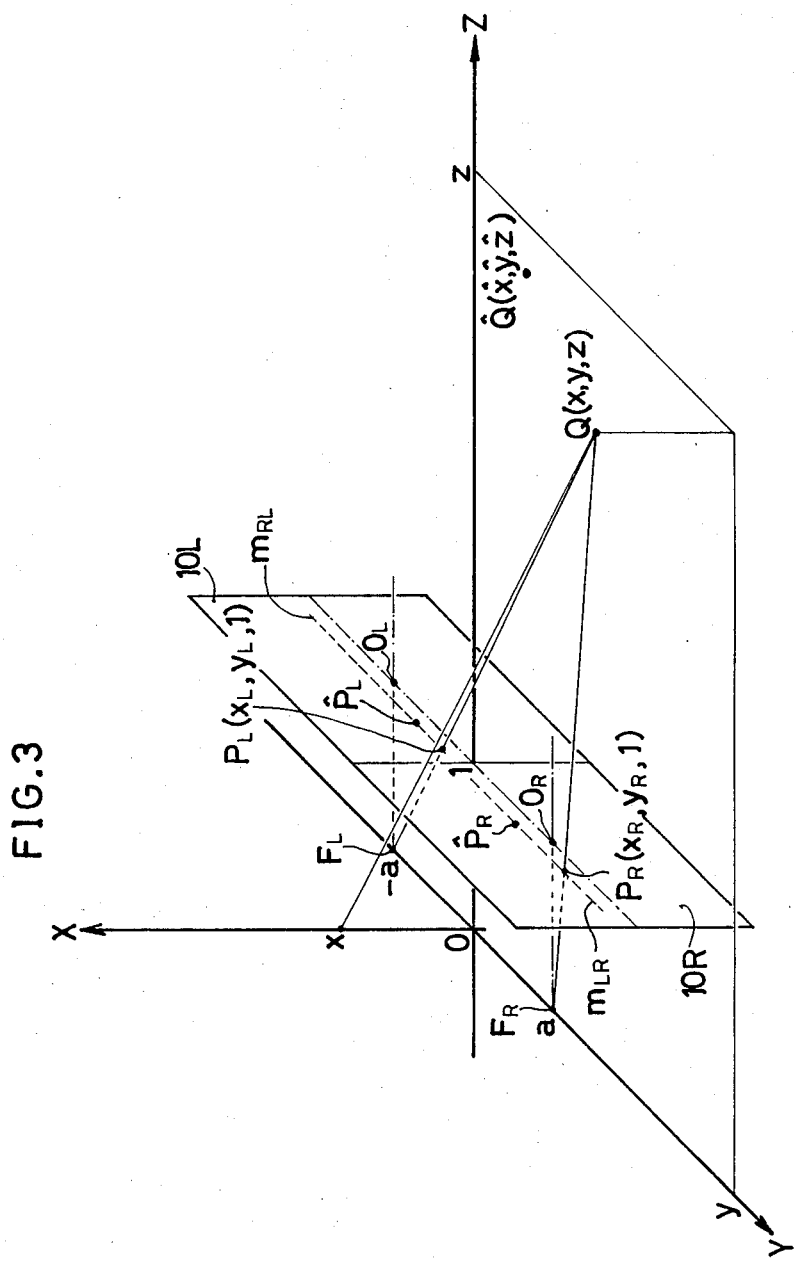
FIG. 3 schematically shows the optical systems of TV cameras in the arrangement of FIG. 2.
Figure 4:
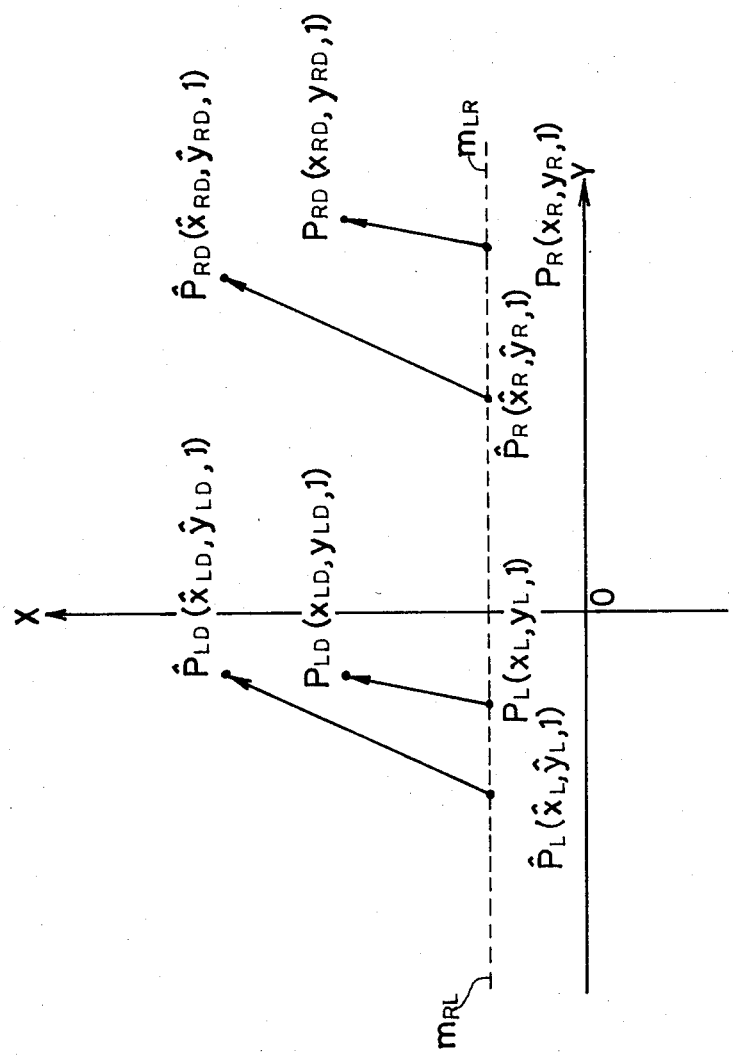
FIG. 4 shows the displacement vectors of mutually corresponding image points.

FIG. 3 schematically shows the optical systems of the TV cameras 20L and 20R. The centers $F_L$, $F_R$ of the lenses are respectively at the positions of $y = -a, a$ on the Y-axis. The image planes 10L, 10R, although actually positioned in the region of negative z values, are at the positions of $z=1$ in FIG. 3 for a better understanding. This will not result in errors in deriving the restricting conditions. The image points of an object point $Q(x, y, z)$ on the image planes 10L, 10R are indicated at $P_L(x_L, y_L, 1)$, $P_R(x_R, y_R, 1)$.

The coordinates of the object point Q and the coordinates of the image points $P_L$, $P_R$ having the following relationship.

$$x_L = \frac{x}{z} \quad (1)$$

$$y_L = \frac{y+a}{z} - a \quad (2)$$

$$x_R = \frac{x}{z} \quad (3)$$

$$y_R = \frac{y-a}{z} + a \quad (4)$$

The epipolar line $m_{LR}$ formed by the image point $P_L$ on the image plane 10R and the epipolar line $m_{RL}$ formed by the image point $P_R$ on the image plane 10L are horizontal lines (parallel with the Y-axis). Equations (1) and (3) indicate that these lines $m_{LR}$ and $m_{RL}$ are equal in X coordinate ($x_L = x_R$).

Equations (1) and (4) give the coordinates of the object point Q.

$$x = \frac{(x_L + x_R) \cdot a}{(2a + y_L - y_R)} \quad (5)$$

$$y = \frac{(y_L + y_R) \cdot a}{(2a + y_L - y_R)} \quad (6)$$

$$z = \frac{2a}{(2a + y_L - y_R)} \quad (7)$$

Equations (5) to (7) indicate that the coordinates of the object point Q can be calculated by detecting the coordinates of the two image points $P_L$ and $P_R$ which correspond to each other.

However, the image points $\overline{P}_L$ and $\overline{P}_R$, corresponding to each other, of an object point $\overline{Q}(\overline{x}, \overline{y}, \overline{z})$ which satisfy the following Equations (8) and (9) are also present on the epipolar lines $m_{RL}$ and $m_{LR}$, so that there is the need to separate the image points $P_L$, $P_R$ from the image points $\overline{P}_L$, $\overline{P}_R$.

$$x/z = \overline{x}/\overline{z} \quad (8)$$

$$y/z = \overline{y}/\overline{z} \quad (9)$$

The image points $P_L$, $P_R$ can be separated from the image points $\overline{P}_L$, $\overline{P}_R$ by translating the TV cameras 20L, 20R along the X-axis by a distance $\alpha$ and further rotating the cameras about the Z-axis through an angle $\phi$ (detailed demonstration will not be given).

When the cameras 20L, 20R are translated along the X-axis by the distance $\alpha$ and thereafter rotated about the Z-axis through the angle $\phi$, the mutually corresponding image points $P_L$, $P_R$ are displaced to positions represented by $P_{LD}(x_{LD}, y_{LD}, 1)$, $P_{RD}(x_{RD}, y_{RD}, 1)$, and the image points $\overline{P}_L$, $\overline{P}_R$, to positions $\overline{P}_{LD}$, $\overline{P}_{RD}$, respectively. The coordinates of the new image points $P_{LD}$, $P_{RD}$ are given by the following equations.

$$x_{LD} = \frac{1}{z}[(x - \alpha) \cdot \cos\phi + y \cdot \sin\phi] \quad (10)$$

$$y_{LD} = \frac{1}{z}[y \cdot \cos\phi - (x - \alpha) \cdot \sin\phi + a] - a \quad (11)$$

$$x_{RD} = \frac{1}{z}[(x - \alpha) \cdot \cos\phi + y \cdot \sin\phi] \quad (12)$$

$$y_{RD} = \frac{1}{z}[y \cdot \cos\phi - (x - \alpha) \cdot \sin\phi - a] + a \quad (13)$$

Equations (10) and (12) show that the new corresponding image points $P_{LD}$, $P_{RD}$ are equal in X coordinate ($x_{LD} = x_{RD}$).

As stated above, the corresponding image points $P_L$, $P_R$ have equal X coordinates, i.e. $x_L = x_R$. After the displacement, as well as before the displacement, each of the mutually corresponding image points is positioned on the epipolar line formed by the other. This first restricting condition is expressed by the following equations very simply.

$$x_L = x_R \quad (14)$$

$$x_{LD} = x_{RD} \quad (15)$$

Equations (2), (4), (11) and (13) readily afford the second restricting condition, which is expressed by the following equation.

$$y_{LD} - y_L = y_{RD} - y_R \quad (16)$$

In combination with Equations (14) and (15), Equation (16) expresses that the displacement vectors $\overrightarrow{P_L P_{LD}}$, $\overrightarrow{P_R P_{RD}}$ of the mutually corresponding image points on the image planes of the two cameras are equal. The expression that the two vectors are equal means that they are identical in direction and equal in length.

By using the conditions of Equations (14) to (16), the image point $P_R$ corresponding to the image point $P_L$ can be identified.

The coordinates of the object point Q can be derived also from Equations (10) to (13).

$$x \equiv x_D = a + \cos\phi \cdot \frac{(x_{LD} + x_{RD}) \cdot a}{(2a + y_{LD} - y_{RD})} \quad (17)$$

$$- \sin\phi \cdot \frac{(y_{LD} + y_{RD}) \cdot a}{(2a + y_{LD} - y_{RD})}$$

$$y \equiv y_D = \cos\phi \cdot \frac{(y_{LD} + y_{RD}) \cdot a}{(2a + y_{LD} - y_{RD})} + \quad (18)$$

$$\sin\phi \cdot \frac{(x_{LD} + x_{RD}) \cdot a}{(2a + y_{LD} - y_{RD})}$$

$$z \equiv z_D = \frac{2a}{(2a + y_{LD} - y_{RD})} \quad (19)$$

Figure 5:
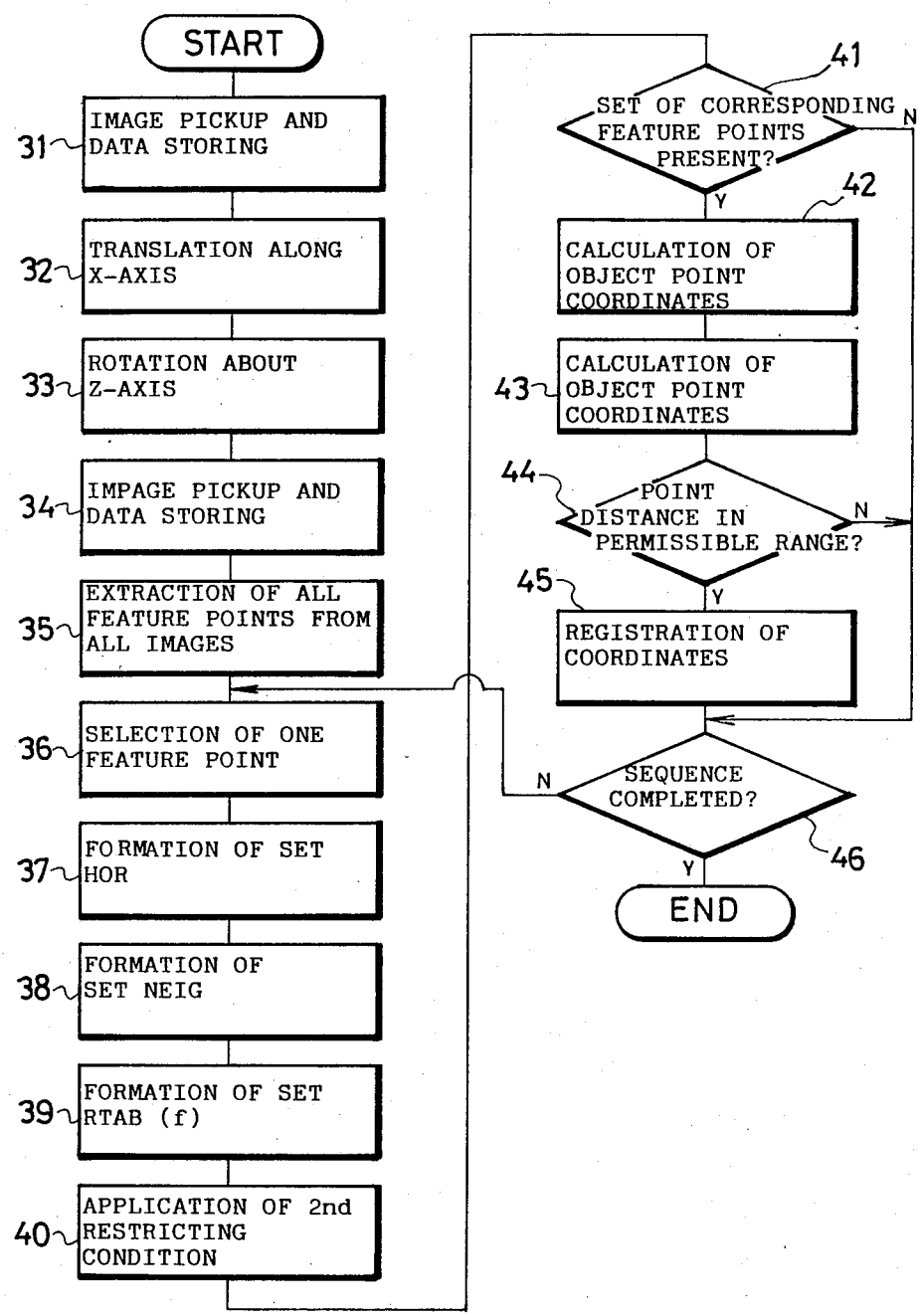
FIG. 5 is a flow chart showing the steps of processing images according to the above embodiment.

Based on the fundamental concept described above, the operation of the image processor 24 will be described below with reference to FIG. 5.

First, images of an object are picked up by the two TV cameras 20L, 20R arranged as indicated in solid lines in FIG. 2, and the resulting image signals are subjected to analog-to-digital (A/D) conversion and stored in the memory (step 31). Next, the lift device 23 translates the cameras 20L, 20R along the X-axis by a distance $a$ (step 32). Subsequently the rotating device 22 rotates the cameras about the Z-axis through an angle $\phi$ (step 33). Thus, the cameras are brought to the positions indicated in broken lines in FIG. 2. Images of the object are similarly picked up by the cameras 20L, 20R thus positioned, and the image data is stored in the memory (step 34). The above procedure affords data as to four images, i.e. two images before the displacement of the cameras and two images after the displacement.

Feature points are extracted from the four images (step 35) by a known procedure. For example, a line image is drawn in conformity with each image, and points where the tangential direction of the contour line of the line image markedly changes are extracted as feature points. The coordinates of all the extracted feature points are stored in a specified area of the memory for each of the four images.

Figure 6:
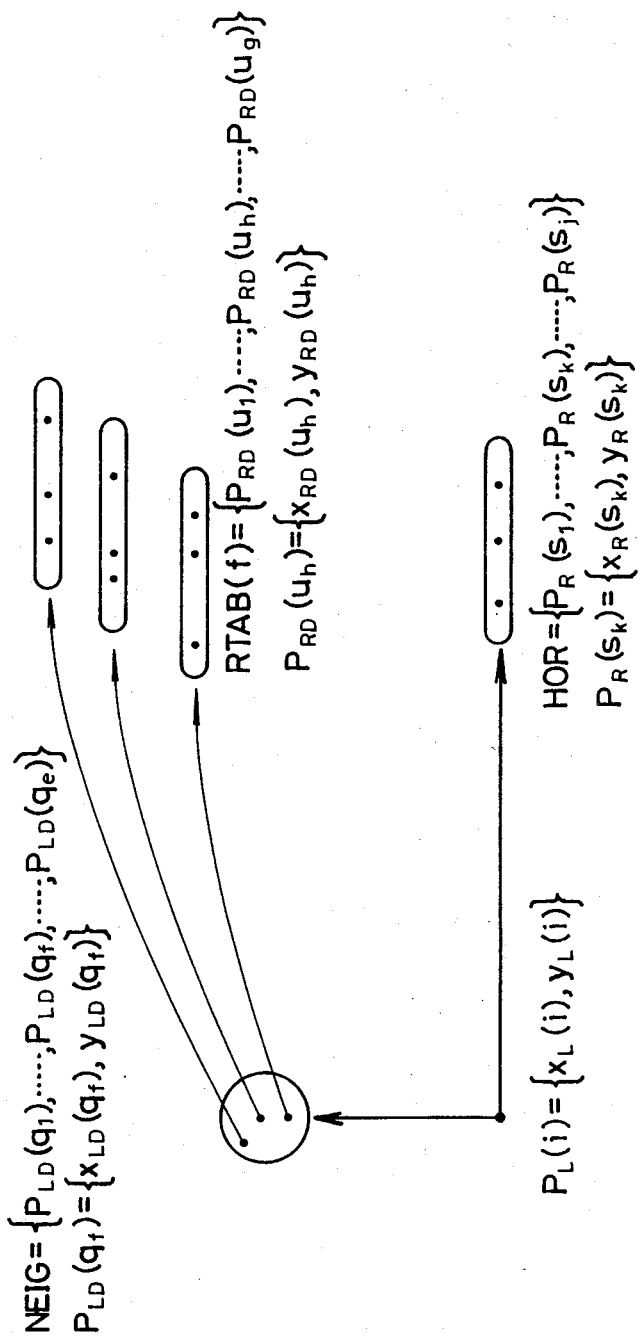
FIG. 6 is a diagram for illustrating the algorithm used for processing images according to the embodiment.

The above procedure is followed by a process wherein the foregoing restricting conditions are used and which is generally shown in FIG. 6.

One feature point is selected from among those extracted, before the displacement, from the image on the TV camera on the left side (step 36). This feature point is represented by $P_L(i) = \{x_L(i), y_L(i)\}$. The Z coordinate, which is 1, is omitted.

The first restricting condition, $x_L = x_R$ (Equation (14)) is used to search the feature points, extracted from the image on the right TV camera before the displacement, for the feature points having the same X-coordinate value as the X coordinate $x_L(i)$ of the selected feature point $P_L(i)$ (step 37). The set of such feature points is represented by HOR.

$$HOR = \{P_R(s_1), \ldots, P_R(s_k), \ldots, P_R(s_j)\}$$

$$P_R(s_k) = \{x_R(s_k), y_R(s_k)\}$$

$$|x_L(i) - x_R(s_k)| \leq \epsilon \quad (20)$$

wherre $\epsilon$ is a positive value approximate to zero and determined in view of errors in the image data.

The relationship between the selected feature point $P_L(i)$ on the left-side image before the displacement and the corresponding feature point on the left-side image after the displacement involves no restricting condition, so that all the feature points on the left-side image after the displacement are to be processed. However, the number of feature points to be processed is then very large. It is therefore desirable to limit the range of feature points which are likely to correspond to the feature point $P_L(i)$. The amount of displacement of the cameras, $a$, $\phi$, is predetermined, and each feature point is to be displaced within a range which is determined by the amount of displacement $a$, $\phi$. The largest amount by which the feature point on the image will be displaced with the displacement of the camera is represented by TH. Of the feature points on the left-side image after the displacement, those which are likely to correspond to the feature point $P_L(i)$ are considered to be contained in the following set NEIG.

$$NEIG = \{P_{LD}(q_1), \ldots, P_{LD}(q_f), \ldots, P_{LD}(q_e)\}$$

$$P_{LD}(q_f) = \{x_{LD}(q_f), y_{LD}(q_f)\}$$

$$\sqrt{\{x_{LD}(q_f) - x_L(i)\}^2 + \{y_{LD}(q_f) - y_L(i)\}^2} \leq TH \quad (21)$$

The set NEIG is called a set of feature points approximate to the feature point $P_L(i)$. The feature points contained in this set are listed as selected from among the feature points on the left-side image after the displacement (step 38).

The first restricting condition $x_{LD} = x_{RD}$ (Equation (15)) is applied. Of the feature points on the right-side image after the displacement, the feature points satisfying this condition with the feature points contained in the set NEIG are selected to form a set for each feature point of the set NEIG (step 39). Such a set is represented by RTAB(f) (f = 1 to e).

$$RTAB(f) = \{P_{RD}(u_1), \ldots, P_{RD}(u_h), \ldots, P_{RD}(u_g)\}$$

$$P_{RD}(u_h) = \{x_{RD}(u_h), y_{RD}(u_h)\}$$

$$|x_{LD}(q_f) - x_{RD}(u_h)| \leq \epsilon \quad (22)$$

The feature points contained in the sets HOR, NEIG and RTAB are checked as to whether there is a set of feature points which satisfy the second restricting condition (Equation (16)) with the feature point $P_L(i)$ (step 40). The second restricting condition is expressed as follows.

$$|\{y_{LD}(q_f) - y_L(i)\} - \{y_{RD}(u_h) - y_R(s_k)\}| \leq \epsilon \quad (23)$$

k = 1 to j
f = 1 to e
h = 1 to g

The following approximate condition is also additionally used for the processing of step 40.

$$\sqrt{\{x_{RD}(u_h) - x_R(s_k)\}^2 + \{y_{RD}(u_h) - y_R(s_k)\}^2} \leq TH \quad (24)$$

The four feature points satisfying Equations (23) and (24) are image points corresponding to one another.

When a set of such mutually corresponding feature points is present, the coordinates (x, y, z) of the object point is calculated from Equations (5) to (7) with use of the coordinates of the corresponding right and left feature points before the displacement (step 42). Similarly the coordinates $(x_D, y_D, z_D)$ are calculated from Equations (17) to (19) with use of the coordinates of the corresponding right and left feature points after the displacement (step 43). These coordinates (x, y, z) and $(x_D, y_D, z_D)$ must match but will not match strictly owing to measuring errors. Accordingly if the distance between the calculated coordinates is within the range of a permissable error DH, the results are judged as being acceptable (step 44). The permission condition is as follows.

$$\sqrt{(x_D-x)^2+(y_D-y)^2+(z_D-z)^2} \leq DH \quad (25)$$

When this condition is satisfied, the following average values are stored in the memory as the coordinates of the image point of the feature point $P_L(i)$ (step 45).

$$\bar{x} = \tfrac{1}{2}(x + x_D) \quad (26)$$

$$\bar{y} = \tfrac{1}{2}(y + y_D) \quad (27)$$

$$\bar{z} = \tfrac{1}{2}(z + z_D) \quad (28)$$

Further the coordinates of the feature point on the right-side image before the displacement and the feature points on the right- and left-side images after the displacement which points are determined as being in corresponding relation to the feature point $P_L(i)$ are also registered in the memory along with the feature points $P_L(i)$.

When no set of corresponding feature points is found in step 41 or when the permission condition is not filfilled in step 44, step 46 checks whether the foregoing sequence of steps has been executed for all the feature points on the left-side image before the displacement. If the sequence has not been completed for some feature points, the sequence is repeated from step 36.

Instead of displacing two TV cameras, two TV cameras may be additionally provided in the broken-line positions in FIG. 2 to use four cameras, whereby four corresponding feature points can be determined by the same process as above.

Further corresponding feature points can be determined on three images with use of three TV cameras.

FIG. 1 shows the image plane of another TV camera as indicated at 13. The center of the image plane 13 is indicated at $O_3$. The lens of the TV camera has a center $F_3$ and an optical axis $\overline{O_3F_3}$. Indicated at $P_3$ is an image point of the object point Q, at $\overline{P}_3$ an image point of the object point $\overline{Q}$, and at $m_{13}$ an epipolar line formed by the image point $P_1$ on the image plane 13. The image points $P_3$ and $\overline{P}_3$ are positioned on the line $m_{13}$. A line $m_{23}$ is an epipolar line formed by the image point $P_2$ on the image plane 13. The image point $P_3$ only is positioned on this line, and the image point $\overline{P}_3$ is not on this line. The image point $P_3$ is positioned on the point of intersection of the two epipolar lines $m_{13}$ and $m_{23}$.

The following second restricting condition can be derived from the above.

The image point $P_3$ on the third image plane 13 corresponding to the image point $P_1$ on the first image plane 11 is present on the point of intersection of the epipolar line $m_{13}$ formed by the image point $P_1$ on the third image plane 13 and the epipolar line $m_{23}$ formed on the third image plane 13 by the image point $P_2$ on the second image plane 12 corresponding to the image point $P_1$.

Figure 7:
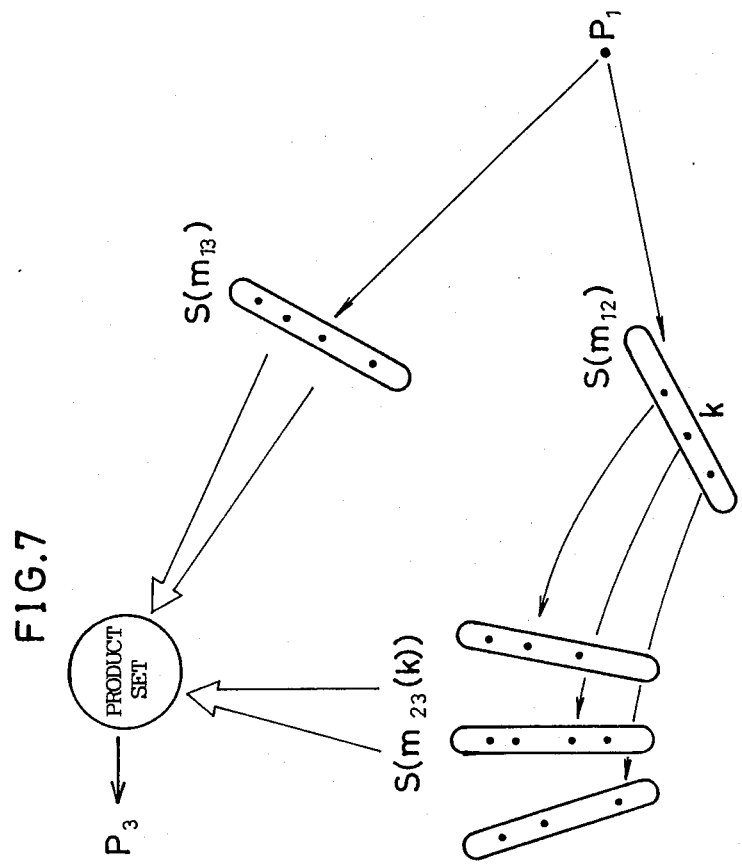
FIG. 7 is a diagram for illustrating an image processing algorithm according to another embodiment.

FIG. 7 shows an algorithm for determining corresponding feature points (image points) on three image planes with use of the foregoing first restricting condition and second restricting condition. All feature points are extracted from the three image planes, followed by the following sequence of steps.

(1) One feature point $P_1$ is selected on the first image plane.

(2) The epipolar line $m_{12}$ formed by the selected feature point $P_1$ on the second image plane is determined, and a set $S(m_{12})=\{P_{21}, \ldots, P_{2k}, \ldots, P_{2j}\}$ of feature points present on the epipolar line $m_{12}$ is determined.

(3) For all the feature points contained in the set $S(m_{12})$, an epipolar line $m_{23}(k)$ formed by the feature point $P_{2k}$ on the third image plane is determined. A set $S(m_{23}(k))$ of feature points on the epipolar line $m_{23}(k)$ is determined (k=1 to j).

(4) The epipolar line $m_{13}$ formed by the selected feature point $P_1$ on the third image plane is determined. A set $S(m_{13})$ of feature points present on the epipolar line $m_{13}$ is formed.

(5) A product set of the set $S(m_{13})$ and the set $S(m_{23}(k))$ (where k is 1 to j) is calculated, that is, a pair of feature points of equal coordinates is selected from among the feature points contained in the set $S(m_{13})$ and the feature points contained in the set $S(m_{23}(k))$.

What is claimed is:

1. A process for recognizing a three-dimensional object comprising the steps of:

receiving images of the object from at least three directions, extracting feature points from each of the at least three images obtained, forming a first set of feature points on an epipolar line formed on the second image by a selected feature point on the first image, forming a second set of feature points on an epipolar line formed on the third image by a selected feature point on the first image or by a feature point corresponding thereto, and selecting from the two sets of feature points a pair of feature points corresponding to each other and satisfying a restricting condition which is determined by the relationship of the image receiving directions.

2. A process as defined in claim 1 wherein the selecting step comprises:

forming a third set of feature points on an epipolar line formed on the third image by a feature point contained in the first set, and calculating a product set of the second set and the third set of feature points.

3. A process for recognizing a three-dimensional object comprising the steps of:

receiving images of the object from at least four directions, extracting feature points from each of the four images obtained, forming a first set of feature points on an epipolar line formed on the second image by a selected feature point on the first image, forming on the third image a set of approximate feature points relating to the selected feature points on the first image, forming a second set of feature points on an epipolar line formed on the fourth image by a feature point contained in the set of approximate feature points, and selecting from the three sets feature points which satisfy with the selected feature point in the restricting condition that the displacement vectors of two mutually corresponding feature points are equal.

4. A system for recognizing a three-dimensional object comprising:

means for receiving images of the object from at least three directions, means for extracting feature points from each of the at least three images obtained, first means for forming a first set $S(m_{12})$ of feature points on an epipolar line formed on the second image by a selected feature point $P_1$ on the first image, second means for forming a second set $S(m_{13})$ of feature points on an epipolar line formed on the third image by a selected feature point $P_1$ on the first image, third means for forming third sets $S(m_{23}(k))$ of feature points on epipolar lines formed on the third image by respective feature points contained in the first set, and means for calculating a product set of the second set of feature points and the third sets of feature points.

5. A system for recognizing a three-dimensional object comprising:

means for receiving images of the object from at least four directions, means for extracting feature points from each of the four images obtained, first means for forming a first set (HOR) of feature points on an epipolar line formed on the second image by a selected feature point ($P_L$) on the first image, second means for forming on the third image a second set (NEIG) of approximate feature points relating to the selected feature point ($P_L$) on the first image, third means for forming third sets (STAB) of feature points on epipolar lines formed on the fourth image by feature points contained in the second set (NEIG) of feature points, and means for selecting, from the above three sets of feature points, a set of feature points which satisfy with the selected feature point $P_L$ the restricting condition that the displacement vectors of two mutually corresponding feature points are equal.

6. A system as defined in claim 5 wherein said image receiving means comprises two TV cameras having optical axes in the direction of Z-axis, the cameras being arranged on a plane X-Y and spaced apart by a predetermined distance along the Y direction, and wherein the cameras are rotatable about the Z-axis and movable along the X-axis.

* * * * *